United States Patent [19]

Pinnow

[11] Patent Number: 4,573,046

[45] Date of Patent: Feb. 25, 1986

[54] WATCH APPARATUS AND METHOD FOR A UNIVERSAL ELECTRONIC LOCKING SYSTEM

[75] Inventor: Douglas A. Pinnow, Laguna Hills, Calif.

[73] Assignee: Universal Photonics, Inc., Cheshire, Conn.

[21] Appl. No.: 547,713

[22] Filed: Nov. 1, 1983

[51] Int. Cl.[4] ....................... E05B 47/00; G08B 13/08; H04Q 9/00

[52] U.S. Cl. ................................. 340/825.56; 70/277; 70/DIG. 51; 361/172; 340/696; 340/825.31

[58] Field of Search ....................... 340/825.31, 825.56, 340/825.36, 696, 825.58, 825.32, 543; 361/162, 172; 70/278, 279, 285, DIG. 51; 455/603

[56] References Cited

U.S. PATENT DOCUMENTS

| | | | |
|---|---|---|---|
| 3,024,452 | 3/1962 | Leonard . | |
| 3,029,345 | 4/1962 | Douglas . | |
| 3,144,761 | 8/1964 | Lee | 70/277 |
| 3,872,435 | 3/1975 | Cestaro | 340/825.31 |
| 4,130,738 | 12/1978 | Sandstedt | 340/825.56 |
| 4,143,368 | 3/1979 | Route et al. | 340/543 |
| 4,189,712 | 2/1980 | Lemelson | 340/825.31 |
| 4,196,347 | 4/1980 | Hadley | 340/825.31 |
| 4,218,681 | 8/1980 | Hormann | 455/603 |
| 4,313,229 | 1/1982 | Blackington | 455/603 |
| 4,325,146 | 4/1982 | Lennington | 455/604 |
| 4,354,189 | 10/1982 | Lemelson | 340/825.31 |
| 4,412,356 | 10/1983 | Klaus et al. | 455/603 |
| 4,509,093 | 4/1985 | Stellberger | 340/825.31 |

*Primary Examiner*—Donald J. Yusko
*Attorney, Agent, or Firm*—Bacon & Thomas

[57] ABSTRACT

An apparatus and method for providing a universal electronic locking system (UELS) which controls an actuating device for a lock is disclosed. The system is composed of two elements, a signal-transmitting unit and a signal-receiving unit. The signal-transmitting unit is envisioned, in one embodiment, as contained within a watch and powered by the power source of the watch so as to transmit an optical signal to the signal-receiving unit. The integrated circuit chip of the watch is expanded to include a programmable memory unit such that various codes may be entered in the watch and the codes may be changed at any interval desired by the operator. The digital display of the watch serves a dual purpose for displaying time and for entering key codes. The signal-receiving unit comprises a photodetector for receiving an optical signal from the signal-transmitting unit and contains a programmable memory unit which is responsive to each and all codes contained in the signal-transmitting unit. Upon changing the code signal in the signal-transmitting unit, the memory unit of the signal-receiving unit may be reprogrammed so as to be responsive to the newly encoded signal and allow the latching mechanism of the lock system to be operated. The UELS is contemplated for applications in the home, business, industry, recreation, defense and wherever locks and codes are used.

36 Claims, 7 Drawing Figures

WATCH APPARATUS AND METHOD FOR A UNIVERSAL ELECTRONIC LOCKING SYSTEM

BACKGROUND OF THE INVENTION

The present invention relates to an apparatus and method for an electronic locking system. The system encompasses both a signal transmitting unit and a signal receiving unit for an electronically controlled and optically actuated locking system to replace the use of mechanical keys and mechanically controlled code locks such as combination locks. This invention recognizes that cost effective electronic and electro-optic components can be combined to make a locking system with reliability that exceeds that of purely mechanical locking devices. In addition, the storage of coded key information in a digital format within a portable solid state memory, which may be incorporated in a wrist watch or some similar device, is more convenient than actually carrying a set of keys. This locking system has universal application in home, business, recreation, defense, etc., wherever locks or codes are used.

Several previous systems are known which, through complexity of operation or bulk of transmitting and receiving units fail to provide the flexibility and ease of operation of the present electronic locking system. Among the known prior art systems is U.S. Pat. No. 3,024,452 which discloses a multi-digit electric door lock. The system amounts to merely an electrical combination lock in which a plate is provided with a plurality of pushbuttons containing the digits zero through nine. After they are manually preset to a combination which will unlock the door, the pushbuttons may then at any time thereafter be actuated in succession with the three digit number to which they were manually preset so as to unlock the door by causing a solenoid to be temporarily energized.

U.S. Pat. No. 3,029,345 discloses an electronic key card system which requires a card B to be inserted in a slot of a control housing 12. In this system, each of the cards are provided with predetermined portions identified at reference numerals 20 and 21 to transmit light from one side of the control housing to the opposite side of the control housing which contains a photodetector circuit. If the predetermined portions of the control card B allow for the light to be transmitted therethrough, the system will unlatch a door lock controlled by a power source.

U.S. Pat. No. 3,144,761 discloses a lock release system which is operated by infrared radiation. The lock release system is manually operated by the rotation of a drive means 32 which moves a chopper disc which has a predetermined amount of material removed from various sections thereof. When the key device is placed to a window of a safe, the manual drive system 32 is rotated so as to move the chopper disc so that, during the movement, light passes through part of the cutaway disc. The output of the key is therefore a steady amount of infrared radiation which is interrupted by pulses. The detector, upon the receipt of a preset sequence of signals, unlocks the latching mechanism and allows entry to the safe. This system merely allows a constantly energized source of light to be interrupted by a manually rotated disc so as to sequence the light in a predetermined manner.

U.S. Pat. No. 3,872,435 discloses an opto-electronic security system wherein the key apparatus and the lock apparatus are precoded and which does not include an integral electrical power source. The lock device code is preset during the manufacture by hard wiring the components to transmit only a factory-assembled code.

U.S. Pat. No. 4,143,368 discloses a vehicle operator security system in which the driver of a vehicle carries a portable infrared signal generator which is actuatable to generate, selectively, at least two separate digitally coded infrared signals. The locking mechanism, contained in the vehicle, receives the signals, decodes them and actuates an apparatus in response to the first digital code so as to perform a first function such as unlocking a door to the vehicle. The second digital code is received so as to sound an alarm, upon actuation of the operator, at any time the operator perceives a reason for actuating the alarm. The transmitter unit of the locking system is provided with preset code storage means which contain a 14 bit identification code for four different switches. The code storage means are permanently contained in the transmitter.

U.S. Pat. No. 4,218,681 discloses a hand-held transmitter of the type that is well known for controlling the remote movement of garage door installations or like systems. The unit is provided with two different electromagnetic frequencies which can be transmitted as signals after a circuit-actuation pushbutton is turned on.

U.S. Pat. No. 4,325,146 discloses a non-synchronous object identification system which utilizes light-emitting diodes and detectors for supplying coded information to and receiving coded pulses from a device carried in the vehicle which is to be identified.

U.S. Pat. No. 4,354,189 and 4,189,712 relate to switch and lock activating systems and methods. The patents are related as a continuation and contain the same disclosure. The disclosure relates to a system and method for opening a lock or activating a switch by electronically controlled devices. The device utilizes a finger ring which contains a code recording associated with the crown of the ring. Although the use of a watch is shown in conjunction with controlling a lock, it is to be noted that the watch is to be used in conjunction with a coded finger ring and therefore the codes, read by the lock actuating mechanism, are transmitted from the coded finger ring and the watch generates an energy field which is activated only when the ring is disposed within a cavity of the lock-actuating mechanism so that the code contained therein can be read.

SUMMARY OF THE INVENTION

The present invention relates to a method and apparatus for an electronic locking system which is designed to replace the typical key, card and mechanical combination locks that are well known in the present state of the art.

The system includes a signal transmitting unit and a signal receiving unit by which a light signal is transmitted to a light signal receiving unit for controlling the latching and unlatching of a lock mechanism. The light source may be programmed so as to transmit a coded optical signal through the air to an optical port in the signal receiving unit. The signal receiving unit is provided with a memory unit so as to match the received, encoded optical signal with an encoded signal stored in the memory unit of the signal receiving means. A specific feature of the present invention is the elimination of separate and distinct lock operating mechanisms, for each lock device. It is contemplated that the signal transmitting unit would be incorporated in a wrist worn device and specifically an electronic wristwatch of the type which utilizes a power source to energize a silicon integrated circuit chip of the type that normally appears in such electronic wristwatches. Alternatively, the transmitter could be incorporated in a pocket, pendant, or pencil watch, etc. While transmitters may also be made in a form not combined in a watch, the invention recognizes the combination of the transmitter with a watch as a preferred embodiment. This is because certain components of the watch, such as the digital display and battery, can serve dual functions, as described in more detail below, for both telling time and opening locks or transmitting security codes.

The invention further contemplates that such a device be capable of transmitting a plurality of different encoded signals, each of which may be reset or reprogrammed so as to allow the coded signal to be changed whenever desired. This function could also be integrated into the integrated circuit chip for the watch and be controllable by additional function control buttons provided on the watch in addition to those that are normally required for resetting time, date, etc. The invention also recognizes the fact that the transmission of an encoded optical signal may be accomplished extremely efficiently for many operations without substantially draining the power source of the electronic wristwatch. An additional feature of the universal electronic locking system is that a single lock can be designed to be opened by a multiplicity of different codes. The memory unit of the signal receiving unit can store a large number of codes so that when a specific code is received by the photodetector of the signal receiving unit, a comparator-processor can compare this received code with all valid codes that have been entered in the memory unit of the signal receiving unit. Upon a match of codes, the latching mechanism of the locking system would be opened. This particular multi-code operation may be desirable for locks that are used by many people, for example, by members of a club to open the same lock at a shared clubhouse. Such a system would greatly reduce the number of code categories that are required on each individual's signal sending unit.

Of course, it is recognized that many desirable features can be added to or are a part of the universal electronic locking system. For example, the light source may either be a light emitting diode, a semiconductor laser diode or a super radiant light-emitting diode which has the characteristics intermediate between the light-emitting diode and the laser diode. Of course, it is understood that it is preferred to select the most energy efficient combination of power source and photodetector in the signal receiving unit so as to conserve battery power of the watch. In this regard, light-emitting diodes made from aluminum gallium arsenide, with the chemical formula $Al_xGa_{1-x}As$ with the value of x ranging between 0.0 and 0.4, are known to be the most efficient at converting electrical energy in a battery into light energy, and are therefore preferred. Silicon photodiodes are the preferred type of photodetector based on an excellent spectral match of their detectivity to the emission spectra of the aluminum gallium arsenide light emitter. In addition, the silicon photodiodes are inexpensive and are known to be highly reliable.

It is also recognized that the beam of infrared light emitted from the watch would be in the form of the relatively broad cone of light. Therefore, it may be desirable that the beam be somewhat more collimated by setting a lens in front of the light source.

Additionally, the optical port on the signal receiving unit should be covered with a protective window which is transparent to the infrared beam of the signal transmitting light source. To increase detection of the signal transmitted from the watch, an optical filter may be placed between the window and the photodetector of the signal receiving unit to reject all ambient light except the light in the emission band of the light source transmitting element. This would substantially improve the sensitivity of the photodetector element of the signal receiving unit by eliminating undesirable background light which would cause noise in the detected signal. During normal operation, the light source, of the signal transmitting unit, would not be activated by the operator until he was within arm's length of the lock. When the light source is activated, the beam would be aimed at the lock by line-of-sight with the eye. Since the light source is activated such a short distance away, this drastically reduces the light source drive power requirements and allows the unit to be utilized in the smaller housing, such as a watch.

The transmission code format for activating the light source is selected so as to be effective and efficient. An example of such a format would be to convert the six digit code into a binary bit sequence that is transmitted in a frequency shift key format. The transmission bit rate of either 9.6 kilobits per second or 56 kilobits per second would be convenient because both are standard transmission rates used broadly in telecommunications and computer interconnections.

Also, a protective delay feature could be introduced to the electronic processor in the lock so as to protect it from an unauthorized intrusion by a specifically designed transmission device that would rapidly sequence through all possible code combinations. This protective feature would require a delay of a predetermined time period after the signal-receiving unit received a predetermined number of unauthorized code combinations before it could be addressed again by an optical transmitter. Accordingly, this would make the time necessary to sequence through all the possible combinations excessively long.

The device also contemplates the use in vehicle applications including automobiles, earth moving equipment, firetrucks, aircraft (both commercial and military), and ships and boats, in which the electronic locks would be powered from the vehicle battery. Such a system would negate the need for separate ignition locks if the doors were always made to lock when shut when using the new universal electronic locking system. In the case of a dead battery, an electrical connector on the exterior of the vehicle could be utilized to receive a standard nine volt transistor battery which could be connected in the circuit so as to reactivate the lock.

For applications, where there is more that one entry door, the natural redundancy of the system, when applied to each of the entrances, protects the user from being denied access in the event of a signal component failure in one of the locks. As an example, apartments with a single entry door, special locks with redundant components could be designed so as to ensure continued operation of the lock. The locking system is also contemplated as being provided with indicating means for signalling a component failure. The indicating means could be an audible alarm or indicator light. The lock could be energized by a low-power, low-voltage DC system such as a transformer-rectifier used to power video games. Additionally, the system could employ a low voltage AC electrical power supply. In either case, the voltage would be on the order of 9 to 12 volts. The low voltage and low power makes the system much safer from electrical shock and should not require any special Underwriter Laboratory's approval or building code approval. It is contemplated that on new construction houses the locks could be built into the door frames near the door handle rather than being made part of the moving door. This design would eliminate the complication of powering a lock on a swinging door. For existing houses, it is possible to power replacement locks by using a pair of electronic contacts on the door and door frame that form a mating connection when the door is shut. Another possibility for existing homes would be to make the locks self-powered so that they would not require any wire connections. This would be accomplished by fitting a small electrical generator within the door and actuated by the door handle. In addition to the wired power supply, the lock mechanisms may also be powered by small, long-life batteries. To obtain the maximum lifetime performance from a battery powered lock it would be necessary to add an actuating device on a doorknob or near the door that would be activated so as to power the locking mechanism, for a predetermined time period after the actuating device was touched. After this lapsed time, the lock would then be automatically cut off the battery power supply so as to not consume any more electrical power until the actuating device was again activated. So as to warn the user that battery life was coming to an end, the lock could be designed to make an audible tone when there was less than a predetermined number of additional possible activations without changing the battery. Of course, it is realized that the main drain on the battery of such a lock mechanism would be to accomplish the mechanical function of latching the unlatching the lock rather than driving the photodetector and the processing electronics. So as to minimize this battery drain, it is contemplated that the energy required to unlatch the locking mechanism would be mechanically stored in a spring that is compressed when the lock is closed. Then only a small amount of electrical power would be required to move a miniature solenoid that would trip the spring and in turn unlatch the locking mechanism. Alternatively, the mechanical energy to unlatch the locking mechanism could be derived from the turning force on a doorknob or handle. In either case, the concept is to design a locking mechanism that uses a very small amount of electrical energy to trigger some substantially larger source of mechanical energy so as to perform the unlatching function. If one desired to open the door, the handle would be first moved to generate sufficient electrical energy, stored in a capacitor, to make the lock operative for a predetermined time. The wristwatch is then used to transmit the code to the lock in the manner described below. Additionally, with today's technology, for outdoor applications, the lock may be designed to be powered by a small solar cell that is incorporated in the lock. Of course, some capacitive storage would be required so that the lock would be functional at night.

The universal electronic system may also be used in hotels or other multiple rental units that are controlled from a central desk. The desk clerk would have access to each door lock by a data link such as wire pairs, optical fibers, etc. that permits entry or erasure of a code or resetting the lock so that the next code entered will be added to the lock's temporary memory. When a guest registered for a room, the desk clerk would assign the guest a room number and advise the guest that he has just reset the door lock so that it will be activated by the next code received by the guest's watch transmitter. In a case where the guest does not yet have a transmitter, an inexpensive unit having a minimum of features can be assigned to him for the duration of his visit in the same manner that a key is presently assigned. In addition to the remote reset features just described, the door lock can also be designed so that another code, in addition to the guest code, can be added or deleted from the individual lock memory without interfering with the guest's code. This would permit a maid to gain entry into the room. As is to be understood, all codes could be changed from the front desk at convenient intervals. Carrying the concept of remote setting of a lock code further, in certain secure areas a lock may be remotely set in a programmed fashion for many different authorization situations. For example, a lock can be set to allow access only during 8 AM to 5 PM working hours, or a code that might open a bank safe at 9 AM on January 2nd may be rejected on January 3rd. This mode of operation would be useful in banks and other financial institutions, government agencies, storerooms, data files, etc. An additional useful feature is that actuated locks may report the actuation code to a central processor for future reference. An example would be the actuation of a lock to use an office copying machine. Reporting the code could be useful in subsequent charging for service.

The invention also contemplates the use of a hand-held or wrist worn "repeater" device for users of the universal electronic locking system. The repeater would have a photodetector and memory similar to a lock as well as a signal transmitting unit. The repeater would be of convenience when passing an individual's code to someone else. For example, if an automobile equipped with the universal electronic locking system is left with a repair shop, the appropriate code from an individual's signal transmitting unit could be transmitted to a repeater device that would be used by the repair shop's staff. Two types of repeaters are contemplated by the invention: one would have a digital display of the received code and be used for diagnostics by lock repair men and the other would have no display at all and would be commonly used in garages, hotels, etc., as described above.

It is also recognized that in the transition period before the universal locking system becomes broadly accepted, locks could be provided which can be actuated by both keys and the optical activation system contemplated by the disclosure.

DETAILED DESCRIPTION OF THE PREFERRED EMBODIMENTS

Figure 1:
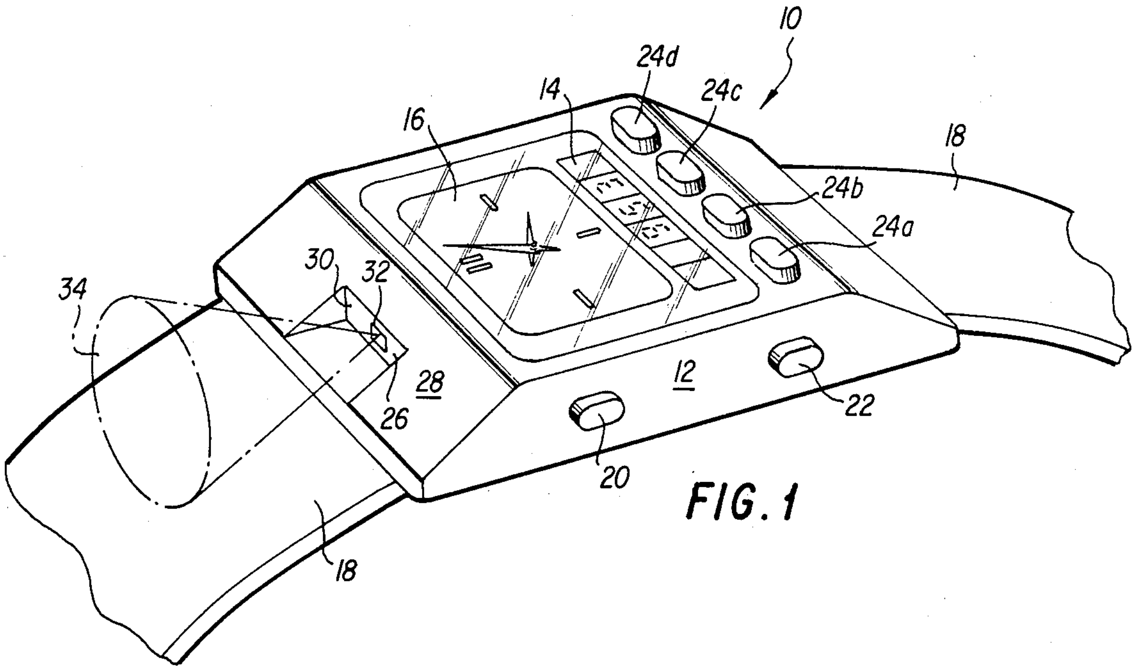
FIG. 1 is a representation of the lock actuating signal transmitting unit incorporated into an electronic wristwatch.

Referring to FIG. 1, the signal transmitting unit, indicated generally at 10, is incorporated in an electronic wristwatch 12 which is provided with a digital display of time 14 and an optional analog time display 16. The watch is shown attached to a wristband 18 but it is to be understood that the band is optional and that the device could well be incorporated into a pocket, pendant or pencil watch or watches which would be worn in various other ways. The electronic watch would be provided with a time reset or display illuminator indicated at reference numeral 20 and a function control key for time and code reset as indicated at 22. The function control key for time reset would function in the well known manner of any electronic watch and the function for code reset will be explained in more detail below. Additionally, the watch is provided with a plurality of code keys at 24 which transmit a preset coded signal from the watch to a signal-receiving unit for unlatching the lock mechanism to be described below. It is noted that while four code keys are shown, various numbers of code keys could be provided so as to transmit an actuating signal to the latching means of the signal receiving unit for controlling the latching mechanism for various locking systems such as at the home, office, recreational areas and automobiles.

A port 26 is provided in the top, end face 28 of the watch. The port provides a window 30 for the light source 32 contained in the watch. As previously discussed, this light source may be one of various types which may be powered by the battery and electronic circuitry contained within the electronic watch. Reference numeral 34 indicates the light-emission pattern from the light source and clearly shows the cone-type projection previously discussed. The cone-type emission pattern 34 from the light source 32, contained in the watch, transmits the coded optical signal through the air to a photodetector contained within the signal receiving unit discussed below. The top location of part 26 is convenient for the user so he can visually align the emission pattern 34 towards the receiver by sighting in the 12 O'Clock direction. Regardless of the number of code keys 24, each may be preset to a desired numerical sequence code in much the same manner that the time or data is presently set into an electronic watch. The code keys 24 are located, for convenience, on the lower front edge of the watch 12. They can be depressed by the user's index finger without interfering with the visual alignment of the emission pattern 34. The separate function control key 22, on the side of the watch, is sequentially depressed to reset time, date and possibly some alarm time. The control key 22 would then be sequentially depressed again so as to control or indicate a code key 24 which is to receive a locking code. For example, if the first code key *24a* is to be reset, the function control key 22 is depressed until a "Cd 1" appears on the watch's digital display. The symbol "Cd" would be an abbreviation for the term "code". Once this occurs, the user will note that he is in the mode to reset a new code by use of the code key *24a*.

Figure 1A:
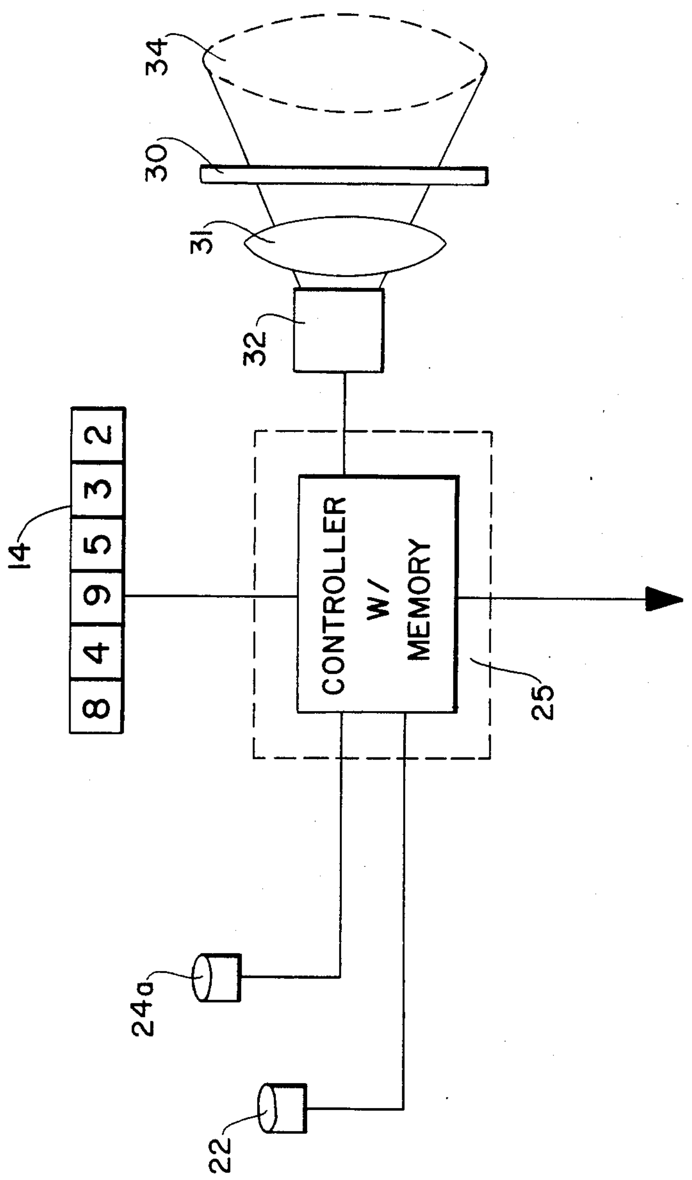
FIG. 1A is a further representation of the lock actuating signal transmitting unit depicted in FIG. 1.

Upon the appearance of the "Cd 1", a multidigit code of, for example, six digits, can be entered by depressing the code key *24a* causing the next digit on the display to sequentially roll until the code key *24a* is released. The sequential roll would be through the digits 1, 2, 3, 4, 5, 6, 7, 8, 9 and 0 until the code button is released. Upon release of the code key *24a*, the digit which is shown in the digital display would be stored in the memory of the electronic watch. The same code key *24a* would then be depressed again until the second digit is selected from the rolling display discussed above. Again, upon releasing the code key *24a*, the indicated digit is then committed to the memory unit provided in the electronic watch. This process is repeated until the entire six digit code is entered. Referring to FIG. 1A, it is seen that the logic functions required to enter the code and subseqently activate the light source, upon command, are all integrated into a silicon integrated circuit chip 25 which also contains the function systems of the electronic watch. FIG. 1A also shows the disposition of lens 31 in front of the light source as previously described. A six digit code is selected so as to enhance the security of the locking system, since the probability of a random coincidental activation would be one in a million. This would provide excellent security against unauthorized opening of the latching unit in the signal-receiving unit. The process for setting a code just described, would be repeated for each of the code keys *24b*, *24c* and *24d* with each code key requiring, in the example given, a six digit number. Of course, it is to be understood that the number of digits embodied in the code could vary depending upon the degree of security required in the locking system and the memory capability contained within the silicon integrated circuit chip. The transmission code format for activating the light source is selected to be effective and efficient. An example of such a format would be to convert the six digit code into a binary bit sequence that is transmitted in a Frequency Shift Key (FSK) format. While this is but one example, the invention is not to be considered so limited and other formats may be utilized.

Figure 2:
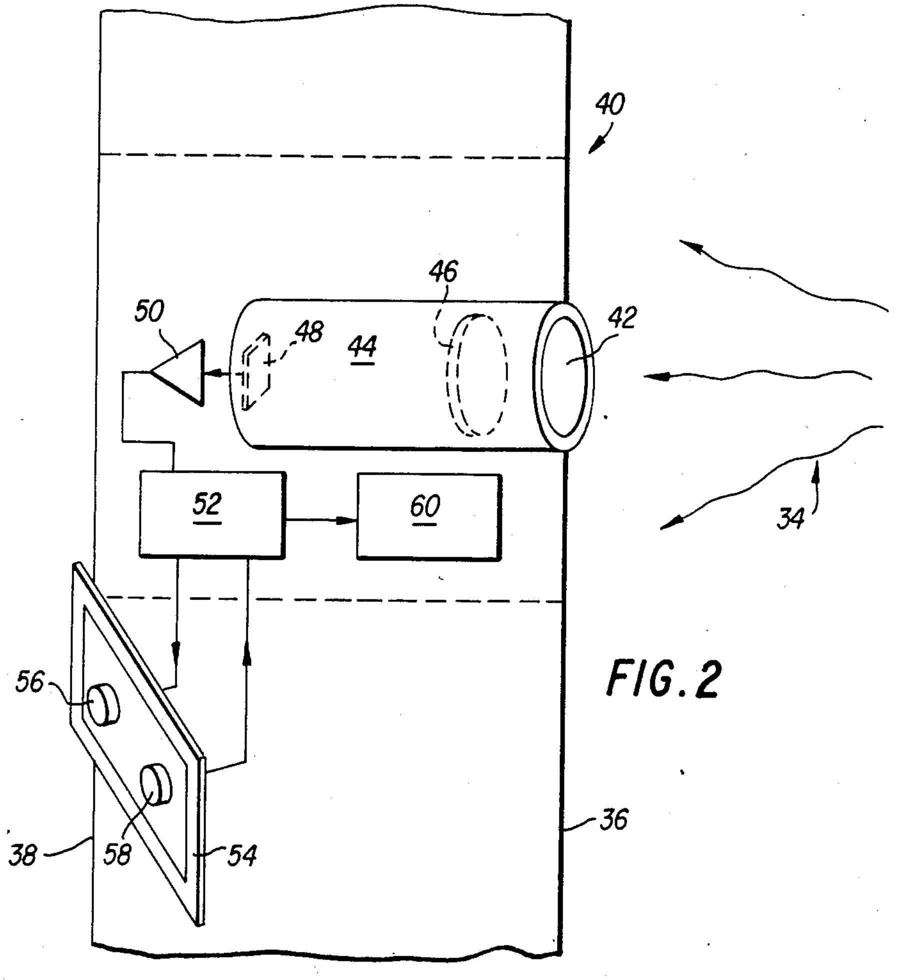
FIG. 2 is a representation of a lock actuating signal-receiving unit and latching mechanism contained within a door or door frame.

FIG. 2 discloses the details of the signal-receiving unit which is located in a door or door frame. The system is indicated generally by reference numeral 40. Also, for purposes of illustration and explanation only, the side of the door frame 36 is considered to be on the outside of the door or enclosure and reference numeral 38 indicates the interior of the enclosure to be protected by the locking system 40. Reference numeral 42 indicates the window of a photodetector structure indicated at reference numeral 44. A pass band filter, indicated at 46, is situated between the window 42 and the silicon photodetector 48. The filter is designed to reject substantially all ambient light except the light in the emission band 34 of the light source 32 in the signal-transmitting unit 10. This considerably improves the sensitivity of the photodetector 48 by eliminating undesirable background light which would cause noise in the detected signal. It is also within the scope of the invention to have the photodetector 48 substantially recessed behind the protective window 42 and have the walls of the tubular cavity 44 leading to the photodetector 48 covered with an optically absorbing material. In this case, a light from the signal-transmitting unit would pass straight through to the photodetector 48 while only a small fraction of the ambient light would have rays that would follow essentially the same path to the photodetector 48. An alternative receiving structure may employ an optical fiber to relay a portion of the signal transmitted from the light emitter to the photodetector. A band pass optical filter placed either in front or after the fiber would be beneficial to reject background light. The use of a fiber relay is particularly beneficial in situations where the lock mechanism may be a substantial distance from the point where access is desired. For example, a fiber optic relay would be useful for opening a garage door without requiring an automobile operator to get out of his vehicle to establish close proximity to the lock mechanism. Downstream of the photodetector 48 is an amplifier 50 which serves the usual function of amplifying the detected signal before transmission to the signal processor 52. Located in the interior 38 of the enclosure desired to be locked is a programmable memory unit 54 provided with two control keys 56 and 58. The control key 56 may be actuated to operate the unit and the control key 58 may be actuated to program the memory unit. When the program control key 58 is actuated, the next code received by the photodetector will be entered in a non-volatile electronic memory chip within the memory unit. In this instance, the term "non-volatile" means that the code will be retained in the memory unit even if electrical power is temporarily lost. Therefore, when a new code is desired to be entered in the signal-transmitting unit 10, it is entered in the manner previously described. In order for the signal-receiving unit to be responsive thereto, the control key 58 is actuated and the new code is transmitted to the memory unit 54 and entered in the memory chip. The control key is then deactuated so as to deny access to the memory unit. When the operating key 56 is then actuated, and the code which was previously transmitted and stored in the memory of the memory unit 54 is received by the photodetector, the processor will automatically compare the received code with the one stored in the memory. If the codes are identical, the processor 52 will instruct the electromechanical latch 60 to open and allow ingress to the enclosed area 38.

Accordingly, a significant feature of the electronic locking system is that locks can be designed to be opened by a multiplicity of different codes. All valid codes may be entered in a fashion similar to that described above and stored in the memory unit 54. When a code is received in the memory unit 54 and the unit is in the operate mode, the processor would compare the received code with all valid codes that were previously entered in the memory unit 54. If the received code matches any one of the codes contained in the memory unit, the electromechanically operated latch 60 would be operated and opened by the processor 52. Of course, the memory unit 54 and access keys 56, 58 would be covered by a plate, not shown, when not in use.

The above-described multi-code operation is particularly desirable for locking systems that are used by a large number of people. For example, many members of a club may use their private codes to open the same lock at a shared clubhouse. This would greatly reduce the number of code keys required on each individual's watch. Additionally, all locks will fall into two categories, i.e., single code locks and multi-code locks. The single code locks will be the least expensive and their memory units will have only the two operators 56, 58 previously discussed. The multi-code locks will have three or four operators for programming the memory unit 54 to receive a code from memory, putting the latching means in an operating mode, deleting codes from the memory unit and possibly for clearing all codes. While the multi-code lock is not illustrated, it is clearly within the concepts of the invention.

Figure 3:
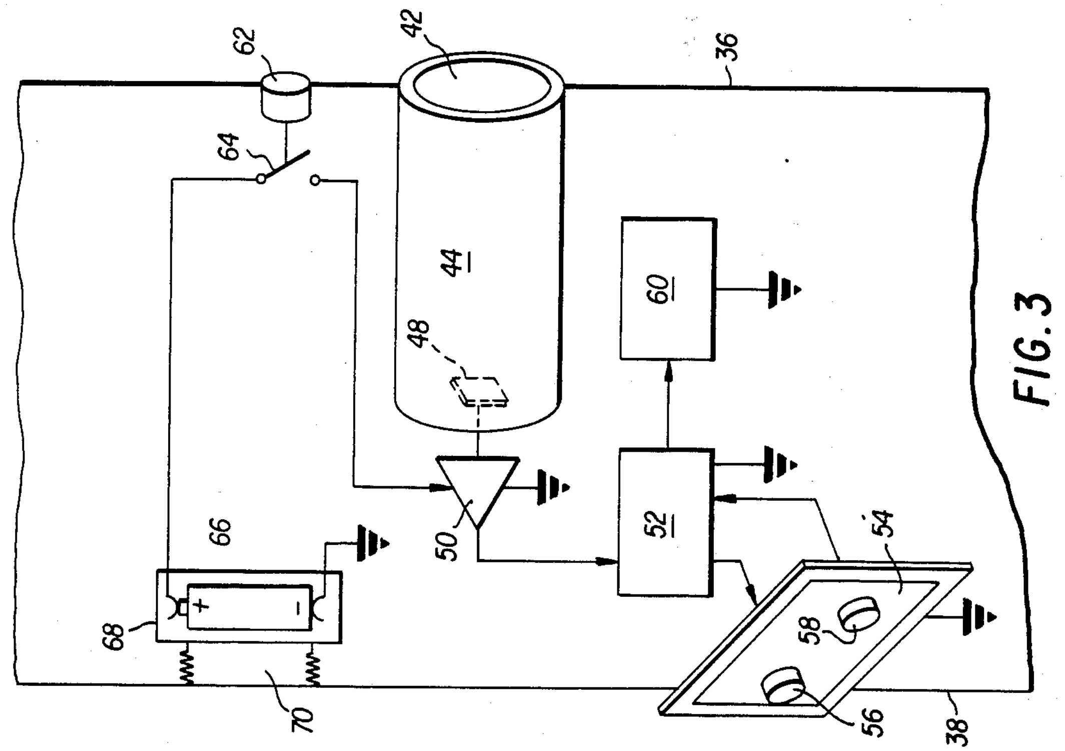
FIG. 3 is a representation of another lock actuating signal-receiving unit and latching mechanism contained within a door or door frame.

FIG. 3 depicts a further embodiment of the signal-receiving unit illustrated in FIG. 2 having a secondary, self-contained electrical system in case of failure of the primary system. In the event of failure of the primary electrical system, activator button 62 is depressed, which closes switch 64 thereby connecting the secondary power source 66 to the primary system through amplifier 50. The secondary power source is typically a battery. The battery is housed within a compartment 68 in the same enclosure as the primary system which is provided with removable cover 70 for battery replacement.

Figure 4:
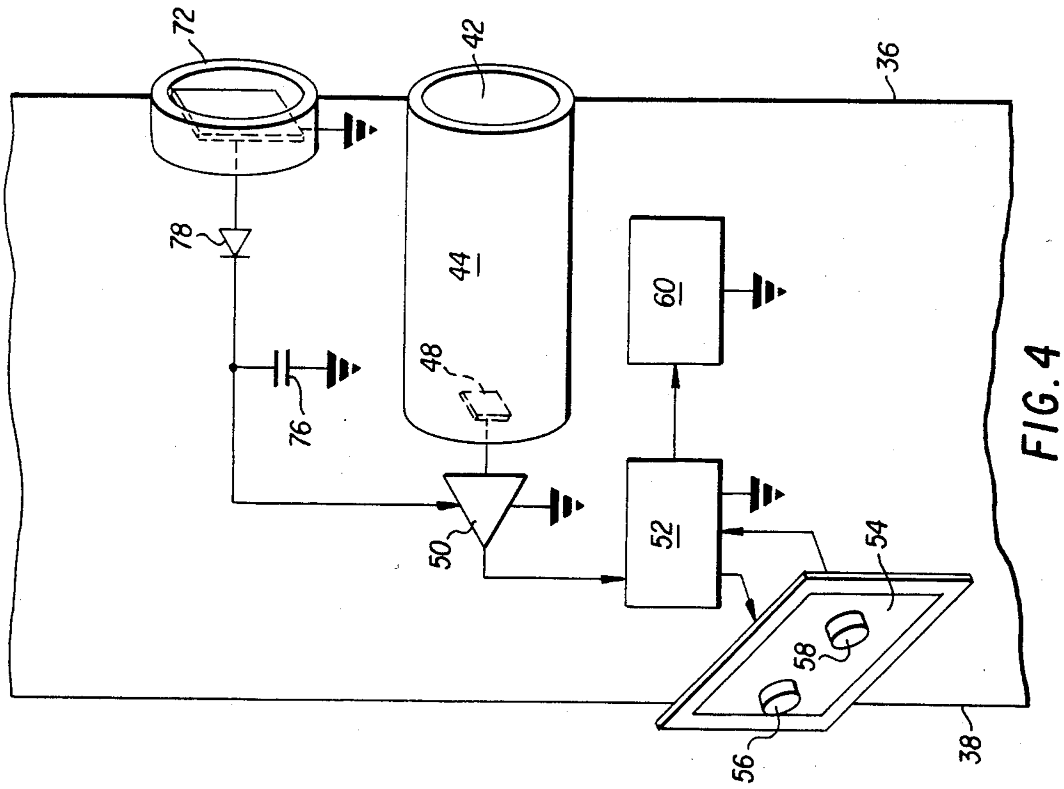
FIG. 4 is a representation of a solar powered lock actuating signal-receiving unit and latching mechanism contained within a door or door frame.

A solar powered signal-receiving unit is shown in FIG. 4 Sunlight enters the unit through solar port 72 and is received by solar cell 74, which transforms the solar energy into electrical energy to power the system. Capcitor 76 is provided to store the electrical energy so that the system can operate in periods of darkness or low light. Diode 78 is provided between the solar cell and the capacitor to prevent the charge stored in the capacitor from discharging through the solar cell during dark periods.

Figure 5:
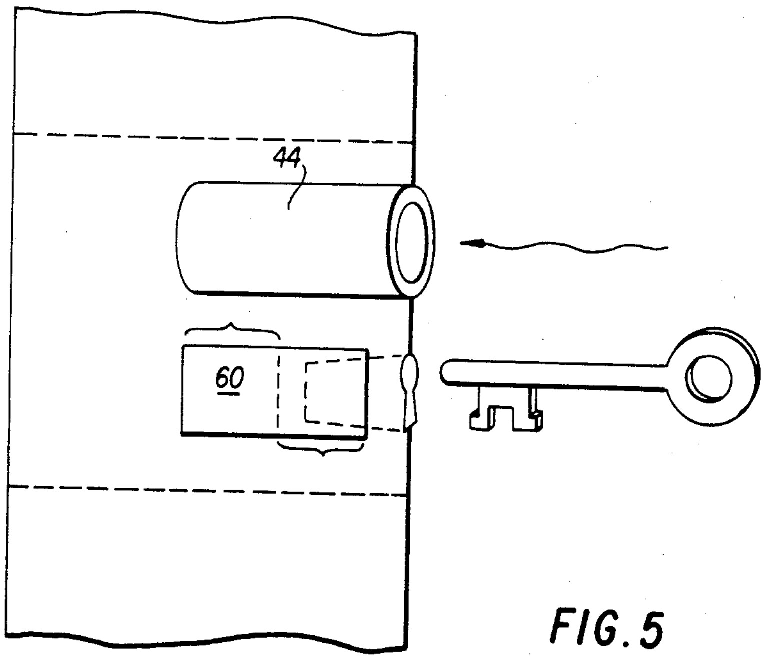
FIG. 5 is a representation of a lock actuating signal-receiving unit and latching mechanism contained with a door or door frame which can be actuated by both optical signal and key.

FIG. 5 shows an embodiment of the invention in which the signal-receiving unit is modified so that the lock may be opened by a key. The key is designed to activate the electro-mechanical unit 60 which opens the lock.

Figure 6:
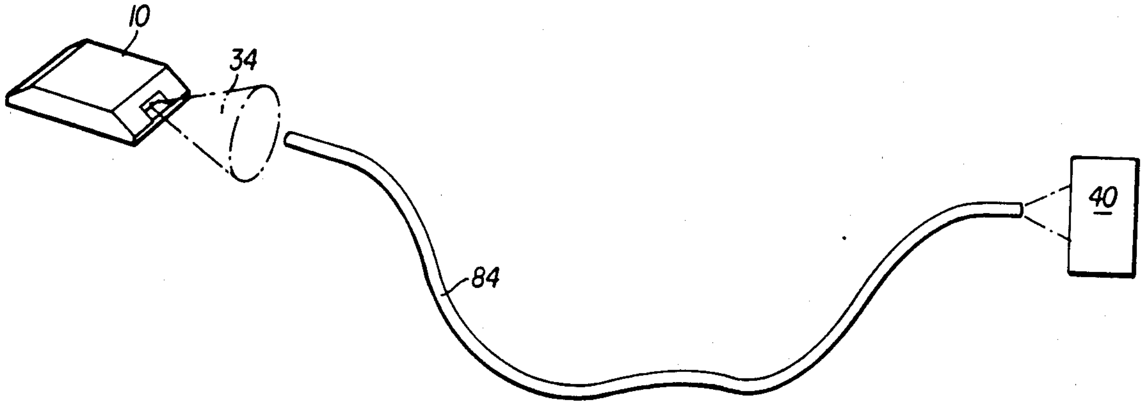
FIG. 6 is a representation of a fiber optic transmission link for transmitting different encoded signals.

FIG. 6 shows a typical fiber optic transmission relay for use in conjunction with the invention. The relay is comprised of optical fiber 84 which receives the optical signal which is emitted from the transmitting unit 10 in a cone-shaped pattern 34. At the other end of the optical fiber, the optical signal exits the fiber in the same cone-shaped pattern and is received by optical receiver in the lock actuating signal-receiving unit 40.

As indicated, an important aspect of this invention is the recognition that many elements already included in typical electronic watches, such as the digital display panel and some function operators, can be used for the dual purpose of telling time and opening locks. Of course it is recognized that the invention may be incorporated into other electronic devices which include many of the functions and integrated circuitry of the modern, electronic watch. State-of-the-art reliability in present day solid state electronics, including optical emitters and photodetectors, makes the electronic locking system more reliable, secure and convenient than present mechanical locking devices.

While the invention has now been described in terms of certain preferred embodiments, the skilled worker in the art will recognize that there are various changes, omissions, modifications and substitutions which may be made without departing from the spirit thereof.

What is claimed is:

1. An electronically actuated locking system comprising a signal transmitting unit contained within a watch and energized by the power source of said watch so as to transmit an encoded optical signal to a signal receiving unit; said signal transmitting unit comprising light emitting means, a first controller which actuates said light emitting means so as to trasmit said encoded signal through an optical port of said watch to said signal receiving unit, said first controller including a first programmable memory unit for storing data corresponding to a plurality of different encoded signals, and means for entering said data into said first memory unit, and said signal receiving unit comprising a photodetector for receiving said encoded signal, a processor which compares said received encoded signal to one or more of a plurality of different codes contained in a second programmable memory unit and means for deactivating a lock mechanism when said received encoded signal matches one of said codes contained in said second memory unit.

2. An electronically actuated locking system as defined in claim 1, wherein each of said plurality of different encoded signals can be transmitted to said signal receiving unit.

3. An electronically actuated locking system as defined in claim 1, wherein the data corresponding to each of said encoded signals stored in said first memory unit can be reset so as to provide different encoded signals for transmitting to said signal receiving unit.

4. An electronically actuated locking system as defined in claim 1, wherein said watch includes a digital time display which may be activated by said first controller so as to display the entry of a new code into said first memory unit.

5. An electronically actuated locking system as defined in claim 1, wherein said second memory unit is programmed to store a received signal only when a second controller is actuated.

6. An electronically actuated locking system as defined in claim 1, wherein said means for deactivating a lock mechanism is actuated only when a second controller is actuated.

7. An electronically actuated locking system as defined in claim 1, wherein said means for entering data corresponding to different encoded signals into said first memory unit comprises first and second control keys.

8. An electronically actuated locking system as defined in claim 7, wherein said first memory unit is actuated to transmit data corresponding to an encoded signal stored therein, only when said second control key is actuated.

9. An electronically actuated locking system as defined in claim 1, wherein an optical filter is located in said signal receiving unit upstream of said photodetector so as to reject substantially all light except light in the emission band of said light emitting means.

10. An electronically actuated locking system as defined in claim 9, further comprising an optical fiber link for transmitting said encoded signals from said signal transmitting unit to said signal receiving unit.

11. An electronically actuated locking system as defined in claim 1, wherein said light emitting means is made from crystalline aluminum gallium arsenide and is a solid state light emitting diode, a laser diode, or a super radiant diode.

12. An electronically actuated locking system as defined in claim 11, wherein said aluminum gallium arsenide comprises a compound having the formula $Al_x Ga_{1-x}As$ wherein x is from 0.0 to 0.4.

13. An electronically actuated locking system as defined in claim 1, wherein said photodetector is a silicon photodiode.

14. An electronically actuated locking system as defined in claim 1, wherein said light emitting means in said signal transmitting unit is protected by a lens so as to partially collimate said encoded optical signal.

15. An electronically actuated locking system as defined in claim 14, wherein said light emitting means and said lens are positioned at the top end face of a wrist-worn watch.

16. An electronically actuated locking system as defined in claim 7, wherein said first and second control keys are positioned on the front lower edge of a wrist-worn watch.

17. An electronically actuated locking system as defined in claim 1, wherein the photodetector is substantially recessed downstream of an optical window within mounting means in said signal receiving unit and the walls of said mounting means are covered with an optically absorbing material so as to exclude substantially all light except light in the emission band of the light emitting means.

18. An electronically actuated locking system as defined in claim 1, wherein said processor includes a time delay which is actuated after a predetermined number of received signals fail to match one of said codes contained in said second memory unit.

19. An electronically actuated locking system as defined in claim 1, wherein said lock mechanism is an electro-mechanical lock mechanism which is powered by a primary electrical system and a secondary, self-contained electrical system in case of failure of said primary system.

20. An electronically actuated locking system as defined in claim 1, wherein said lock mechanism can be actuated by both said encoded optical signal and a key.

21. An electronically actuated locking system as defined in claim 1, wherein said signal receiving unit is powered by a low voltage AC power supply.

22. An electronically actuated locking system as defined in claim 1, wherein said signal receiving unit is powered by a low voltage DC power supply.

23. An electronically actuated locking system as defined in claim 1, wherein said signal receiving unit is positioned in a door frame.

24. An electronically actuated locking system as defined in claim 1, wherein said lock mechanism is positioned in a movable door.

25. An electronically actuated locking system as defined in claim 19, wherein said secondary electrical system is connected to an actuating means which energizes said secondary electrical system to deactivate said lock mechanism when said actuating means is activated.

26. An electronically actuated locking system as defined in claim 25, wherein said actuating means is activated for a predetermined time period and is automatically deactivated thereafter.

27. An electronically actuated locking system as defined in claim 25, wherein said actuating means is a door handle.

28. An electronically actuated locking system as defined in claim 1, wherein said lock mechanism is powered by solar cells.

29. An electronically actuated locking system as defined in claim 28, wherein capacitive storage means is provided in said signal receiving unit so that said actuating means is operable in low light conditions.

30. A method of operating an electronic locking system including a signal-transmitting unit contained within a watch and energized by a power source of said watch so as to transmit an encoded optical signal to a signal-receiving unit, comprising the steps of:

(a) entering and storing data corresponding to a plurality of encoded signals in a programmable memory unit of a signal-transmitting unit that is contained within a watch and energized by a power source of said watch;

(b) emitting a light beam modulated with an encoded optical signal from said signal-transmitting unit in response to actuating a controller contained within said watch and energized by a power source of said watch;

(c) receiving said encoded optical signal in said signal-receiving unit;

(d) comparing said received encoded signal to one or more of a plurality of codes contained in a memory unit of said signal-receiving unit; and, (e) unlocking latching means when said received encoded signal matches one of said codes contained in said memory of said signal-receiving unit.

31. The method of claim 30, including converting said encoded signal into a digital bit stream and transmitting said encoded signal in a Frequency Shift Key format.

32. The method of claim 30, including programming said signal transmitting unit so that a plurality of different encoded signals can be transmitted by said signal-transmitting unit.

33. The method of claim 30, including programming said memory unit of said signal-receiving unit with a plurality of different codes which correspond to said plurality of different encoded signals.

34. The method of claim 30, including positioning an optical filter in said signal-receiving unit and thereby rejecting substantially all light except light of the encoded optical signal.

35. The method of claim 30, including providing a time delay means in said signal-receiving unit; and, actuating said time delay means after a predetermined number of received signals fail to match one of said plurality of different codes contained in a memory unit of said signal-receiving means.

36. The method of claim 30, including operating said latching means by an electromechanical device;

providing a primary power supply for actuation of said electromechanical device;

providing a secondary power supply for actuation of said electromechanical device; and, actuating said secondary power supply upon failure of said primary power supply.

* * * * *